(12) United States Patent
Ness et al.

(10) Patent No.: US 8,311,766 B2
(45) Date of Patent: Nov. 13, 2012

(54) SYSTEM AND METHOD OF MEASURING TEMPERATURE IN A POWER CONTROLLER

(75) Inventors: Keith D. Ness, Winona, MN (US);
Theodore T. Von Arx, La Crescent, MN (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1128 days.

(21) Appl. No.: 12/170,039

(22) Filed: Jul. 9, 2008

(65) Prior Publication Data
US 2010/0007403 A1    Jan. 14, 2010

(51) Int. Cl.
*G01K 1/08* (2006.01)
(52) U.S. Cl. ........................................... 702/132
(58) Field of Classification Search .................... 702/132
See application file for complete search history.

(56) References Cited

U.S. PATENT DOCUMENTS

| | | | |
|---|---|---|---|
| 5,864,465 A * | 1/1999 | Liu | 361/697 |
| 6,094,350 A | 7/2000 | Achiriloaie | |
| 6,200,407 B1 | 3/2001 | Wieloch et al. | |
| 6,584,792 B2 * | 7/2003 | Bay | 62/228.4 |
| 2005/0041397 A1 | 2/2005 | Alford et al. | |
| 2006/0226541 A1 | 10/2006 | Kim et al. | |
| 2009/0024345 A1 * | 1/2009 | Prautzsch | 702/99 |

* cited by examiner

*Primary Examiner* — Jonathan C. Teixeira Moffat
*Assistant Examiner* — Stephen Cherry
(74) *Attorney, Agent, or Firm* — Brinks Hofer Gilson & Lione

(57) ABSTRACT

An improved system and method measuring a temperature in a power controller is provided. The system includes a circuit board, a solid state switching device, a heat sink, and a temperature sensor. The solid state switching device may be mounted on the circuit board and controls the switching of power to an industrial load. The heat sink is mounted on the solid state switching device such that a first portion of the heat sink is thermal communication with the solid state switching device and a second portion of the heat sink is in thermal communication with an exposed portion of a trace on the circuit board. The temperature sensor may be in thermal communication with the trace. As such, the temperature sensor may be in thermal communication with the solid state switching device through the trace of the circuit board.

18 Claims, 5 Drawing Sheets

SYSTEM AND METHOD OF MEASURING TEMPERATURE IN A POWER CONTROLLER

BACKGROUND

1. Field of the Invention

The present invention generally relates to a system and method for measuring a temperature in a power controller.

2. Description of Related Art

Power controllers selectively provide power to loads for a number of industrial applications. The power controllers generally use a solid state switching device to allow or interrupt current flow to the industrial load based on a predetermined profile according to time or some other control parameter. Power controllers often switch more than 5 or 10 Amps of current to an industrial load. As electrical current is allowed to flow through the solid state switching device, not all of the current provided to the solid state switching device is ultimately provided to the industrial load. The solid state switching device does not physically disconnect the load from the power source like the contacts of an electromechanical relay. Instead the solid state switching device controls the flow of current through a voltage applied to transistor junctions. Some of the power provided the solid state relay is lost due to voltage drops across the junctions. Some electrical power is converted to heat as the electrons flow through the junctions.

Heat generated by the solid state switching device can cause damage to the device if it is not properly dissipated. Often heat sinks will be used to transfer the heat away from the device. The heat sinks are often made of metals with a high thermal conductivity allowing the heat to quickly travel away from the device. In addition, heat sinks generally have a large surface area allowing for more rapid dissipation of the heat into the surrounding environment through convection.

However, heat dissipation can be a problem even with a large heat sink. Further, large heat sinks are often undesirable as they increase the overall cost and package size of the power controller.

In view of the above, it is apparent that there exists a need for an improved system and method measuring a temperature in a power controller.

SUMMARY

In satisfying the above need, as well as overcoming the enumerated drawbacks and other limitations of the related art, an improved system and method measuring a temperature in a power controller is provided.

The system includes a circuit board, a solid state switching device, a heat sink, and a temperature sensor. The circuit board includes a trace such as a copper trace printed or etched on the surface of the circuit board. The solid state switching device may be mounted on the circuit board and controls the switching of power to an industrial load. The heat sink is mounted on the solid state switching device such that a first portion of the heat sink is in thermal communication with the solid state switching device and a second portion of the heat sink is in thermal communication with an exposed portion of the trace on the circuit board. The temperature sensor may be mounted on the circuit board and connected to the trace. As such, the temperature sensor may be in thermal communication with the solid state switching device through the trace and the heat sink to determine the temperature of the solid state switching device.

In another aspect of the invention, the solid state switching device is configured to drive an industrial load such as a heater. Further, the solid state switching device may comprise a solid state relay, a triac, or a field effect transistor.

In another aspect of the invention, a temperature sensing leg of the temperature sensor may be connected to the trace. Further, the trace may include a pad and a heat sink may be clamped to the circuit board such that the second portion of the heat sink contacts the pad. In addition, an exposed surface area of the pad is larger than a contact surface area of the heat sink that contacts the circuit board.

In yet another aspect of the present invention, the temperature sensor is in electrical communication with a processor. The processor controls the solid state switching device based on the temperature sensor to reduce the power dissipated by the power switching device. As such, the processor may provide a pulse width modulated signal to the solid state switching device, where the pulse width of the pulse width modulated signal is determined based on the temperature to control the power dissipated by the power switching device. In addition, the processor may control a fan that may be mounted on the heat sink to convection cool the heat sink thereby reducing the temperature of the solid state switching device.

Further objects, features and advantages of this invention will become readily apparent to persons skilled in the art after a review of the following description, with reference to the drawings and claims that are appended to and form a part of this specification.

DETAILED DESCRIPTION

Figure 1:
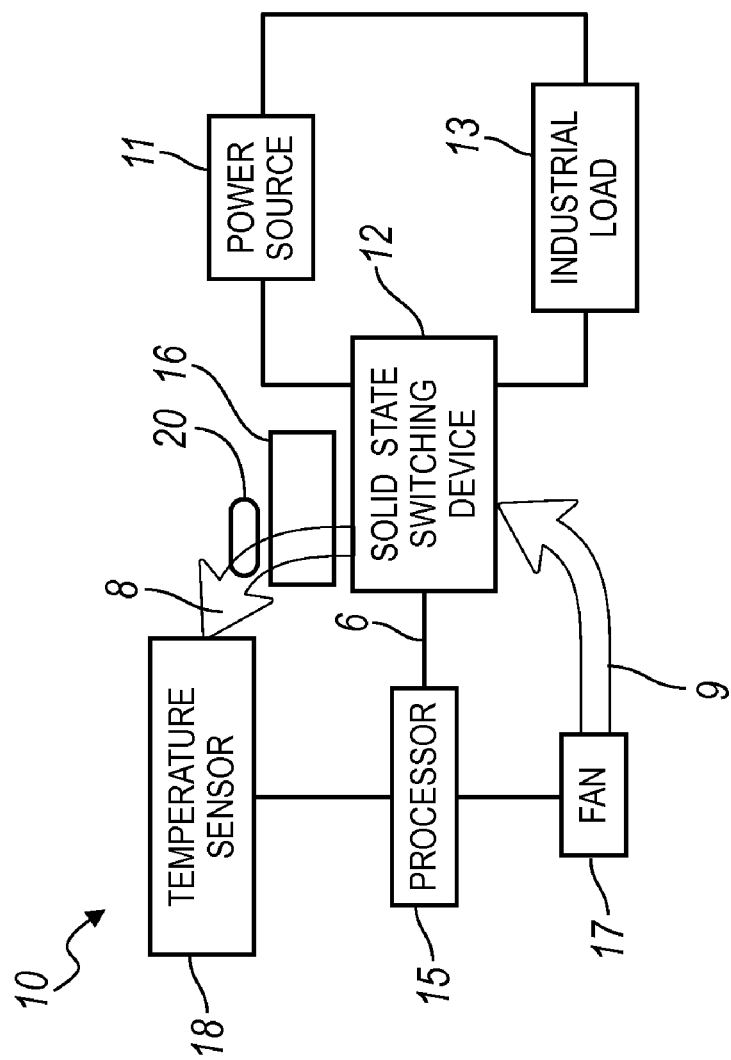
FIG. 1 is a schematic view of a system for measuring a temperature of a power controller.

Referring now to FIG. 1, a system for measuring a temperature in a power controller is illustrated therein and designated at 10. The system 10 includes a solid state switching device 12, a heat sink 16, a trace 20, and a heat sensor 18.

Figure 5:
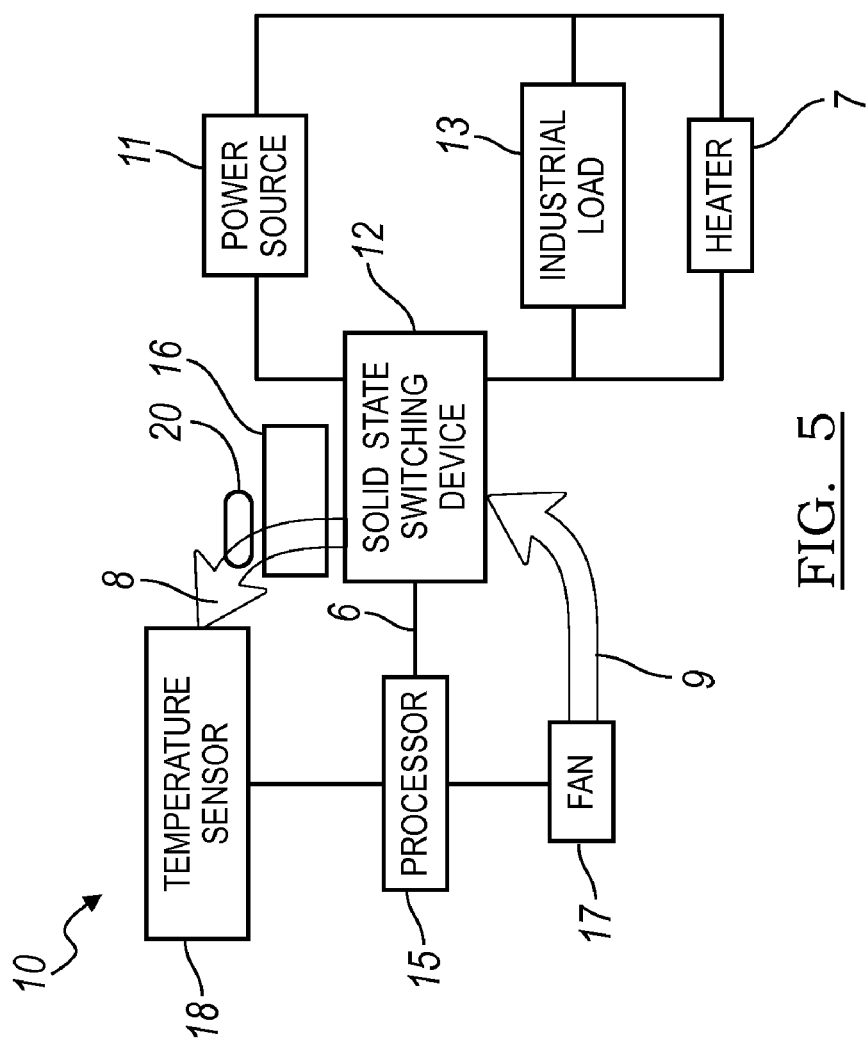
FIG. 5 is a schematic view of a system for measuring a temperature of a power controller.

The solid state switching device 12 is configured to selectively connect a power source 11 to an industrial load 13. Further, the solid state switching device may be configured to provide power to a number of industrial loads in an electrically parallel or series configuration. In one embodiment, the industrial load may be one or more heaters as denoted by reference numeral 7 as shown in FIG. 5. Heaters are often unique from other industrial loads in that many heating processes can tolerate a slow modification of a temperature, while many other processes require a much faster or instantaneous change in output based on the control signal. A processor 15 provides a control signal 6 to the solid state switching device 12 to change the state of the solid state switching device 12 between a conducting state and a non-conducting state. In the conducting state, current flows through the solid state switching device 12 providing power from the power source 11 to the industrial load 13. However, as current flows through the solid switching device 12, losses in the solid state switching device 12 generate heat that must be dissipated into the environment.

If the solid state switching device 12 overheats, the solid state switching device 12 will degrade and eventually fail. Accordingly, the solid state switching device 12 is attached to a heat sink 16 such that the heat generated by the solid state switching device 12 is thermally conducted to the heat sink 16 and transferred away from the solid state switching device 12. In addition, the heat sink 16 may be in electrical communication with a trace 20 on a printed circuit board. Further, the trace 20 on the printed circuit board may be connected to a temperature sensor 18 to monitor the temperature of the heat sink 16 and impliedly a temperature of the solid state switching device 12. Accordingly, a thermal path is created, as denoted by reference numeral 8, from the solid state switching device 12 through the heat sink 16 and the trace 20 to the temperature sensor 18.

The processor 15 is in communication with the temperature sensor 18. As such, the processor 15 may monitor the temperature of the heat sink 16 and/or the solid state switching device 12. Accordingly, the processor may sense an over temperature condition and provide a pulse width modulated signal 6 to the solid state switching device 12 to reduce the amount of power generated in the solid state switching device 12. This may also have the effect of slowing the resulting rate of change of the industrial load 13, such as the heater 7. The processor 15 may change the pulse width of the pulse width modulated signal 6 to control the amount of time the solid state switching device 12 is in the conducting and non-conducting state, thereby manipulating the heat generating characteristics of the solid state switching device 12. In addition, the processor 15 may be in electrical communication with the fan 17 to provide an air flow to the solid state switching device 12 and/or the heat sink 16 to convection cool the solid state switching device 12 and/or the heat sink 16 to further transfer heat away from the solid state switching device 12. The fan 17 provides an additional thermal path, as denoted by reference numeral 9, for the heat generated by the solid state switching device 12 into the environment surrounding the power controller.

Figure 2:
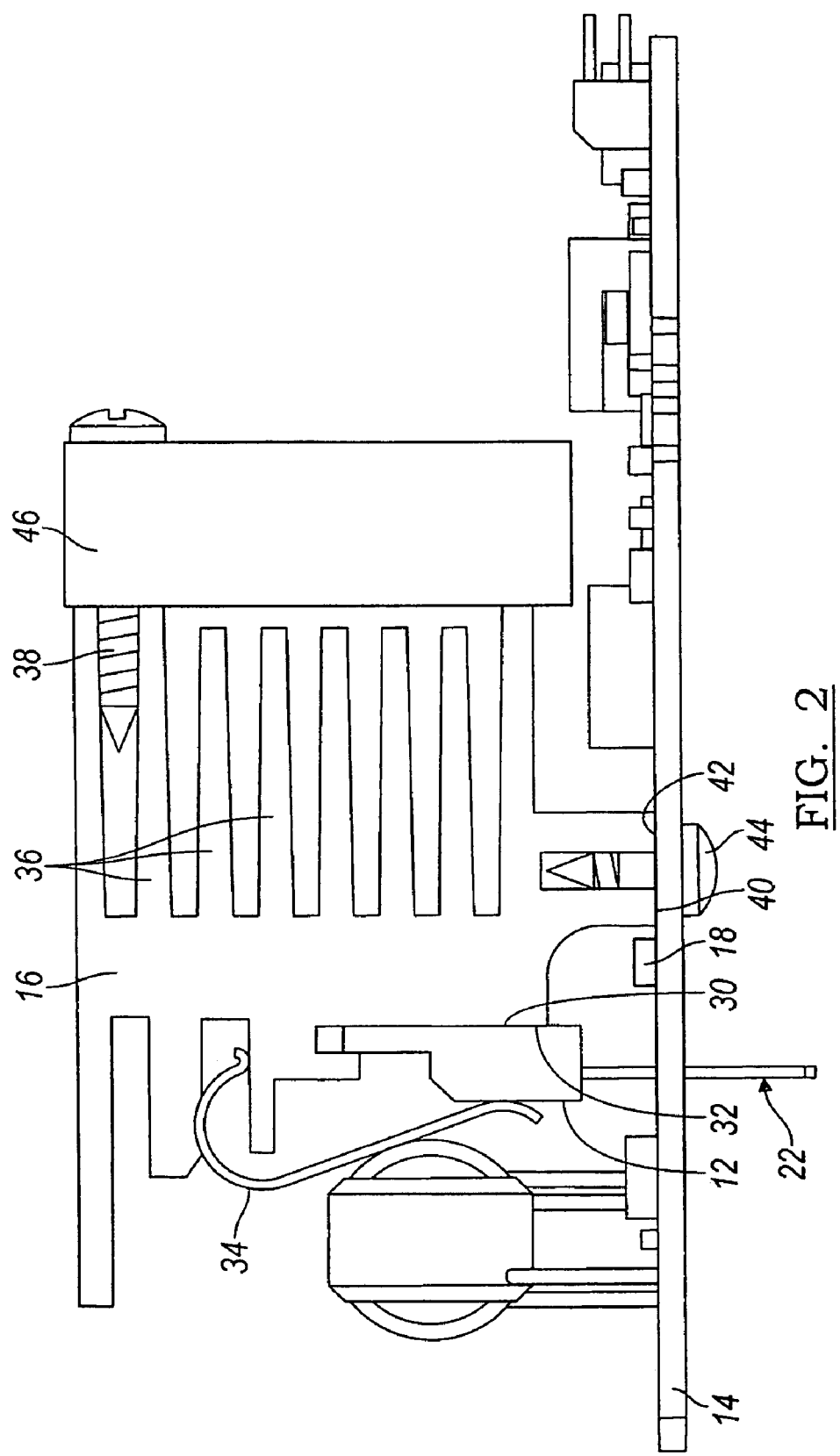
FIG. 2 is a side view of the power controller according to one embodiment of the present invention.
Figure 3:
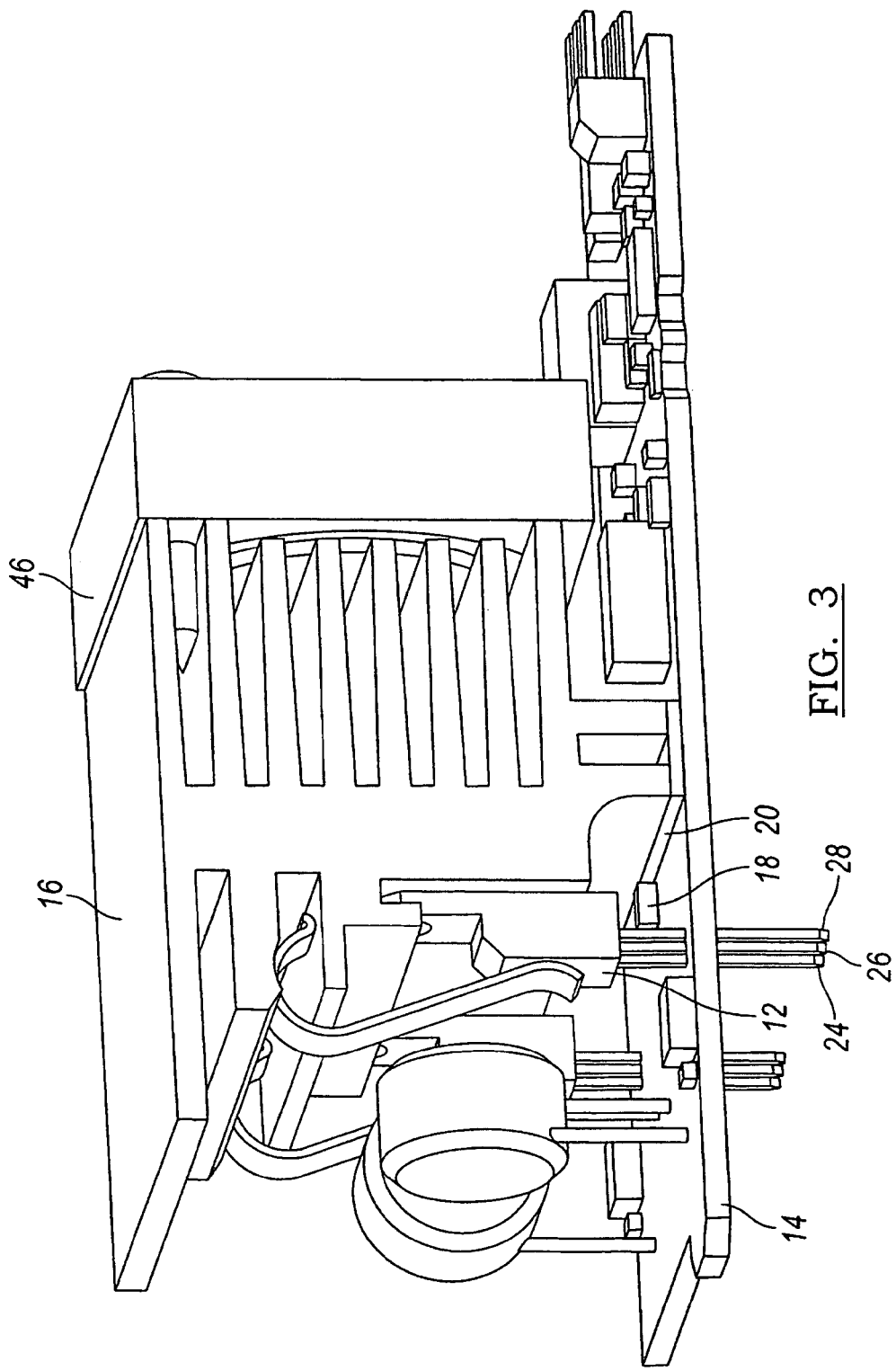
FIG. 3 is a perspective view of the power controller in FIG. 2.

Now referring to FIGS. 2 and 3, one embodiment of a power controller is illustrated. As described above with regard to FIG. 1, the power controller includes a solid state switching device 12, a circuit board 14, a heat sink 16, and a heat sensor 18. The solid state switching device 12 is a solid state device that allows power to be selectively provided to an industrial load through the use of a lower power control signal. The solid state switching device 12 may take many forms including but not limited to solid state relay, a triac, or a field effect transistor (FET). The solid state switching device 12 is mounted to the circuit board 12 through leads 22. A device such as a triac or FET may include three leads, while a solid state relay may include four or more leads.

The leads 22 of the solid state switching device 12 may be inserted through holes in the circuit board 14 and soldered to electrically conductive traces printed on the printed circuit board 14. A first lead 24 may be a power input lead that is electrically connected to a power source configured to drive the industrial load. A second lead 26 may be a control lead that is configured to receive a control signal from a control circuit or processor to allow or prevent current flow through the solid state switching device to power the industrial load. A third lead 28 may be a power output lead that is in electrically connected to the industrial load to provide power when the solid state switching device 12 is active.

The solid state switching device 12 has a surface 30 that is in thermal communication with a surface 32 of the heat sink 16. The surface 30 may be made of a thermally conductive material such as a metal (i.e. copper) that is in communication with a heat producing semiconductor portion of the solid state switching device 12. The surface 32 of the heat sink 16 may also be made of a thermally conductive material. In addition, the entire heat sink 16 is typically formed of a material with high thermal conductivity, such as aluminum or copper. A fastner 34, such as clip, may be attached to the heat sink 16 and may be configured to apply a clamping force to the solid state switching device 12 causing the surface 30 to securely contact and engage the surface 32 of the heat sink 16. As such a thermal pathway between the solid state switching device 12 and the heat sink 16 is formed. The heat sink 16 includes a plurality of fins 36 that significantly increase the surface area of the heat sink 16 allowing for more efficient heat dissipation into the environment. To increase the heat dissipation a fan 46 may be mounted to the heat sink 16. The fan 46 may be configured to circulate air across the heat sink 16 and, more specifically, across the fins 36. The fan 46 may be fixed to the heat sink 16 using a fastener 38 that engages the heat sink 16, such as a screw threaded into the heat sink fins 36.

The heat sink 16 has a second surface 40 in thermal communication with a surface 42 of a trace 20 on circuit board 14. The heat sink 16 may be mounted on the circuit board 14 through a fastener 44, such as a screw that protrudes through a hole in the circuit board 14 and is threaded into the heat sink 16. Accordingly, the fastener 44 applies a force between the circuit board 14 and the heat sink 16 that causes the second surface 40 of the heat sink 16 and the surface 42 of the trace 20 to contact or engage to create a thermal pathway from the solid state switching device 12 to the trace 20 through the heat sink 16.

Figure 4:
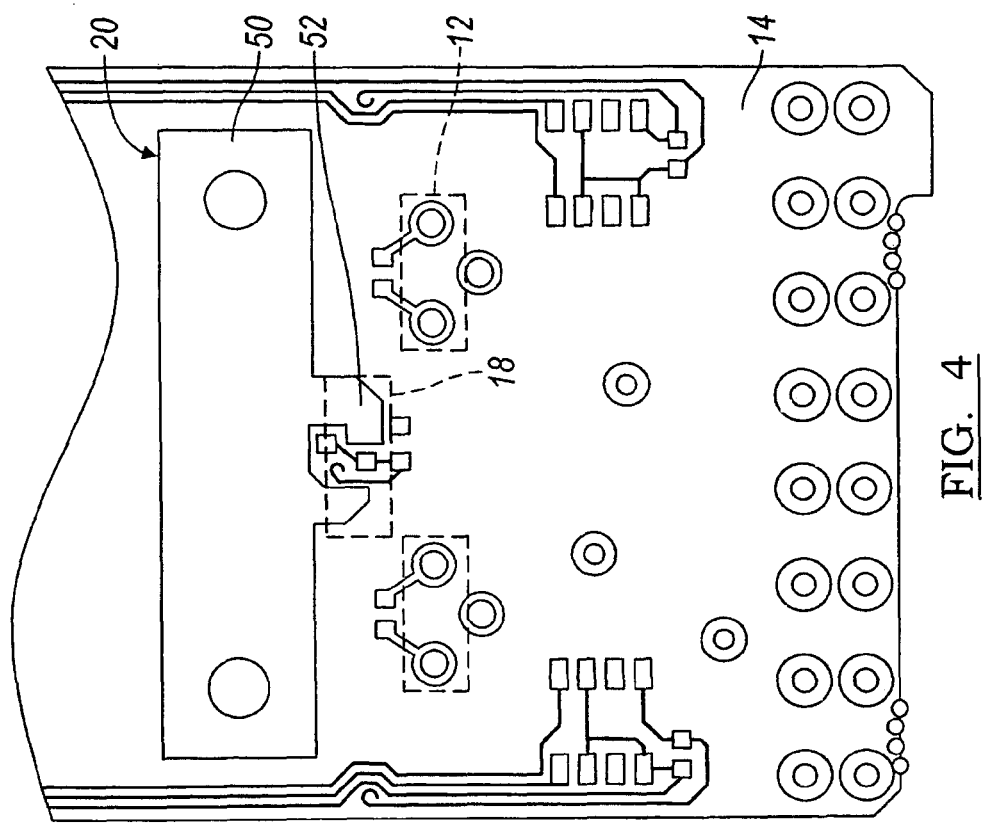
FIG. 4 is top view of the circuit board illustrated in FIG. 2.

Now referring to FIG. 4, a top view of the circuit board 14 is illustrated. The trace 20 may be a thermally and electrically conductive trace. Accordingly, the trace 20 may be made of a metal, such as copper. The trace 20 may include a pad 50 including the surface 42. The pad 50 may be at least as large as the surface 40 of the heat sink 16 such that the pad 50 encircles the surface 40. In other words, in one embodiment the surface 40 of the heat sink 16 does not extend beyond the pad 50 along the circuit board. Further, the trace 20 includes a leg 52 extending from the pad 50 that is in electrical and thermal communication with a lead of the temperature sensor 18. Accordingly, the thermal path is formed between the solid state switching device 12 to the temperature sensor 18 through the heat sink 16 and the trace 20.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

The above description is meant as an illustration of the principles of this application. This description is not intended to limit the scope of this application in that the system is susceptible to modification, variation and change, without departing from spirit of the principles of the application, as defined in the following claims.

We claim:

1. A system for measuring a temperature in a power controller; the system comprising:
    a circuit board having a trace;
    a solid state switching device for switching power to a load;
    a heat sink having a first portion in thermal communication with the solid state switching device and a second portion in thermal communication with an exposed portion of the trace, wherein the trace includes a pad and the heat sink is clamped to the circuit board such that the second portion of the heat sink contacts the pad, an exposed surface area of the pad is larger than a contact surface area of the heat sink that contacts the circuit board;
    a temperature sensor being in thermal communication with the solid state switching device through the trace and heat sink to determine the temperature of the solid state switching device.

2. The system according to claim 1, wherein the solid state switching device is configured to drive an industrial load.

3. The system according to claim 2, wherein the solid state switching device is configured to provide electric power to a heater.

4. The system according to claim 1, wherein the temperature sensor is in communication with a processor, the processor controlling the solid state switching device based on the temperature sensor to reduce the power dissipated by the power switching device.

5. The system according to claim 4, wherein the processor provides a pulse width modulated signal to the solid state switching device, where a pulse width of the pulse width modulated signal is determined based on the temperature to control the power dissipated by the power switching device.

6. The system according to claim 1, wherein the temperature sensor is in communication with a processor, the processor controlling a fan mounted on the heat sink to convection cool the heat sink.

7. The system according to claim 1, wherein the solid state switching device comprises a solid state relay configured to drive an industrial load.

8. The system according to claim 1, wherein the solid state switching device comprises a triac configured to drive an industrial load.

9. The system according to claim 1, wherein a temperature sensing leg of the temperature sensor is connected to the trace.

10. A system for measuring a temperature in a power controller, the system comprising:
    a circuit board having a trace;
    a processor mounted to the circuit board;
    a solid state relay in communication with a heater to selectively provide current to the heater;
    a heat sink being mounted to the circuit board, the solid state relay being mounted to the heat sink, a first portion of the heat sink contacting the solid state relay, a second portion of the heat sink contacting an exposed portion of the trace, wherein the trace includes a pad and the heat sink is clamped to the circuit board such that the second portion of the heat sink contacts the pad, an exposed surface area of the pad is larger than a contact surface area of the heat sink that contacts the circuit board;
    a temperature sensor being mounted to the circuit board and in thermal communication with the solid state relay through the trace and the heat sink to determine the temperature of the solid state relay.

11. The system according to claim 10, wherein the processor provides a pulse width modulated signal, where a pulse width of the pulse width modulated signal is determined based on the temperature to reduce the power dissipated by the power switching device.

12. The system according to claim 10, wherein the processor controls a fan mounted on the heat sink to convection cool the heat sink based on the temperature.

13. Method of measuring a heat sink temperature, the method comprising the steps of:
    providing a trace on a circuit board;
    providing solid state switching device;
    mounting the solid state switching device onto a heat sink;
    wherein a first portion of the heat sink with the solid state switching device conducts heat away from the solid state switching device and a second portion of the heat sink is connected to an exposed portion of the trace thereby forming a thermally conductive path between the heat sink and the trace, wherein the trace includes a pad and the heat sink is clamped to the circuit board such that the second portion of the heat sink contacts the pad, an exposed surface area of the pad is larger than a contact surface area of the heat sink that contacts the circuit board;
    providing a temperature sensor in thermal communication with the trace to sense a temperature of the trace;
    determining a solid state switching device temperature based on the temperature of the trace.

14. The method according to claim 13, further comprising driving an industrial load with the solid state switching device.

15. The method according to claim 14, further comprising driving a heater with the solid state switching device.

16. The method according to claim 13, further comprising controlling the solid state switching device to reduce the power dissipated by the solid state switching device based on the solid state switching device temperature.

17. The method according to claim 16, further comprising providing a pulse width modulated signal to the surface mount device, where a pulse width of the pulse width modulated signal is determined based on the temperature to control the current provided to the heater.

18. The method according to claim 13, controlling a fan mounted on the heat sink to convection cool the heat sink based on the temperature of the trace.

* * * * *